(12) United States Patent
Im et al.

(10) Patent No.: US 8,001,356 B2
(45) Date of Patent: Aug. 16, 2011

(54) METHODS AND APPARATUS FOR REALLOCATING ADDRESSABLE SPACES WITHIN MEMORY DEVICES

(75) Inventors: Jung-Been Im, Gyeonggi-do (KR); Hye-Young Kim, Seoul (KR); Young-Joon Choi, Gyeonggi-do (KR); Dong-Gi Lee, Gyeonggi-do (KR); Shea-Yun Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 191 days.

(21) Appl. No.: 11/565,811

(22) Filed: Dec. 1, 2006

(65) Prior Publication Data

US 2008/0098193 A1    Apr. 24, 2008

(30) Foreign Application Priority Data

Oct. 19, 2006  (KR) .................. 10-2006-0101644

(51) Int. Cl.
*G06F 12/00* (2006.01)
(52) U.S. Cl. ......... 711/173; 711/170; 711/202; 711/103
(58) Field of Classification Search ................ None
See application file for complete search history.

(56) References Cited

U.S. PATENT DOCUMENTS

| | | | | |
|---|---|---|---|---|
| 5,117,350 | A | * | 5/1992 | Parrish et al. ................ 711/1 |
| 6,901,498 | B2 | * | 5/2005 | Conley ...................... 711/173 |
| 2005/0246485 | A1 | | 11/2005 | Assaf et al. |
| 2006/0020943 | A1 | * | 1/2006 | Boutcher et al. ............. 718/104 |
| 2007/0106860 | A1 | * | 5/2007 | Foster et al. ................ 711/170 |

FOREIGN PATENT DOCUMENTS

| | | |
|---|---|---|
| JP | 19980031611 | 2/1998 |
| JP | 20040079140 | 3/2004 |

OTHER PUBLICATIONS

Notice to Submit Response to an Office Action of the Chinese Patent Application No. 200710006117.0, issued on Jan. 30, 2011.

* cited by examiner

*Primary Examiner* — Reginald G Bragdon
*Assistant Examiner* — Baboucarr Faal
(74) *Attorney, Agent, or Firm* — Muir Patent Consulting, PLLC

(57) ABSTRACT

Integrated circuit systems include a non-volatile memory device (e.g, flash EEPROM device) and a memory processing circuit. The memory processing circuit is electrically coupled to the non-volatile memory device. The memory processing circuit is configured to reallocate addressable space within the non-volatile memory device. This reallocation is performed by increasing a number of physical addresses within the non-volatile memory device that are reserved as redundant memory addresses, in response to a capacity adjust command received by the memory processing circuit.

29 Claims, 2 Drawing Sheets

METHODS AND APPARATUS FOR REALLOCATING ADDRESSABLE SPACES WITHIN MEMORY DEVICES

CROSS-REFERENCE TO RELATED APPLICATION

This application claims priority to Korean Patent Application No. 10-2006-0101644, filed Oct. 19, 2006, the disclosure of which is hereby incorporated herein by reference.

FIELD OF THE INVENTION

The present invention relates to integrated circuit systems and, more particularly, to processors for controlling memory devices and methods of operating memory devices.

BACKGROUND OF THE INVENTION

Non-volatile memory devices, such as flash EEPROM devices, have many advantageous characteristics that make them suitable for use in low-power applications. These low-power applications include mobile device applications, such as digital cameras, MP3 music players, cellular telephones, memory cards and personal digital assistants (PDA).

As will be understood by those skilled in the art, operations to program flash EEPROM devices are typically automatically preceded by erase operations (e.g., block erasure), which prepare EEPROM cells within the devices to accept new program data. Thus, it is not uncommon for an operation to program a block of cells within an EEPROM device to be preceded by an operation to erase the block of cells to achieve a "reset" threshold voltage condition within the cells. Unfortunately, performing a relatively large number of erase operations on a block of EEPROM cells may result in the generation of "threshold-voltage" defects within one or more EEPROM cells and thereby reduce an effective lifetime of an EEPROM device.

To address an increase in the number of EEPROM cell defects that may occur in response to increases in the number of "block" erase operations performed on the EEPROM device, many EEPROM devices are configured to have one or more reserved memory blocks of EEPROM cells that operate as "redundant" memory blocks for other active memory blocks of EEPROM cells, which undergo multiple write, read and erase operations during normal use. Each of a plurality of active memory blocks that become defective during use of the EEPROM device may be replaced by a respective reserved memory block. However, once all available reserved memory blocks have been utilized to replace respective active memory blocks, then the detection of any further defects within the EEPROM device during subsequent erase and programming operations may result in device failure.

To reduce the likelihood of EEPROM device failure caused by an excessive number of erase/program operations being performed on one or more active memory blocks, techniques have been developed to relatively evenly distribute erase/program operations across all of the active memory blocks. These techniques may use flash translation layer (FTL) technology to support the relatively even distribution of erase/program operations. Nonetheless, because many of the active memory blocks may have different susceptibilities to defects caused by erase/program operations, the techniques to relatively evenly distribute erase/program operations across multiple active memory blocks may not be entirely successful in achieving relatively long device lifetimes.

SUMMARY OF THE INVENTION

Embodiments of the present invention include integrated circuit systems having non-volatile memory devices and memory processing circuits therein. A typical non-volatile memory devices include flash EEPROM devices. The memory processing circuit is electrically coupled to the non-volatile memory device. The memory processing circuit is configured to reallocate addressable space within the non-volatile memory device. This reallocation is performed by increasing a number of physical addresses within the non-volatile memory device that are reserved as redundant memory addresses, in response to a capacity adjust command received by the memory processing circuit.

According to some of these embodiments, the memory processing circuit includes an address transformation table. The address transformation table is configured to generate physical addresses that map to the non-volatile memory device in response to logical addresses received by the memory processing circuit. The memory processing circuit is further configured to read a memory allocation region within the non-volatile memory device to determine a capacity of an active memory region and/or a reserved memory region within the non-volatile memory device. This read operation is also performed in response to a capacity adjust command received by the memory processing circuit. In addition, the memory processing circuit is configured to write data into the memory allocation region within the non-volatile memory device, in response to the capacity adjust command. In this manner, the memory processing circuit may perform operations to read the memory allocation region to determine a first allocation between active memory blocks and reserved memory blocks within the non-volatile memory device and then write the memory allocation region with a modified allocation between active memory blocks and reserved memory blocks within the non-volatile memory device.

According to still further embodiments of the invention, the integrated circuit system is configured with a non-volatile memory device having at least an active memory region and a reserved memory region therein and a memory processing circuit. The memory processing circuit is configured to adjust capacities of the active and reserved memory regions in response to a capacity adjust command received by the memory processing circuit. The memory processing circuit is configured to read a memory allocation region within the integrated circuit system to determine capacities of the active and reserved memory regions, in advance of adjusting capacities of the active and reserved memory regions. This memory processing circuit may include an address transformation table that is configured to generate physical addresses in response to logical addresses received by the memory processing circuit. These physical addresses map to the non-volatile memory device. The memory processing circuit further includes an address transformation table. This table is configured to generate physical addresses that map to the non-volatile memory device.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
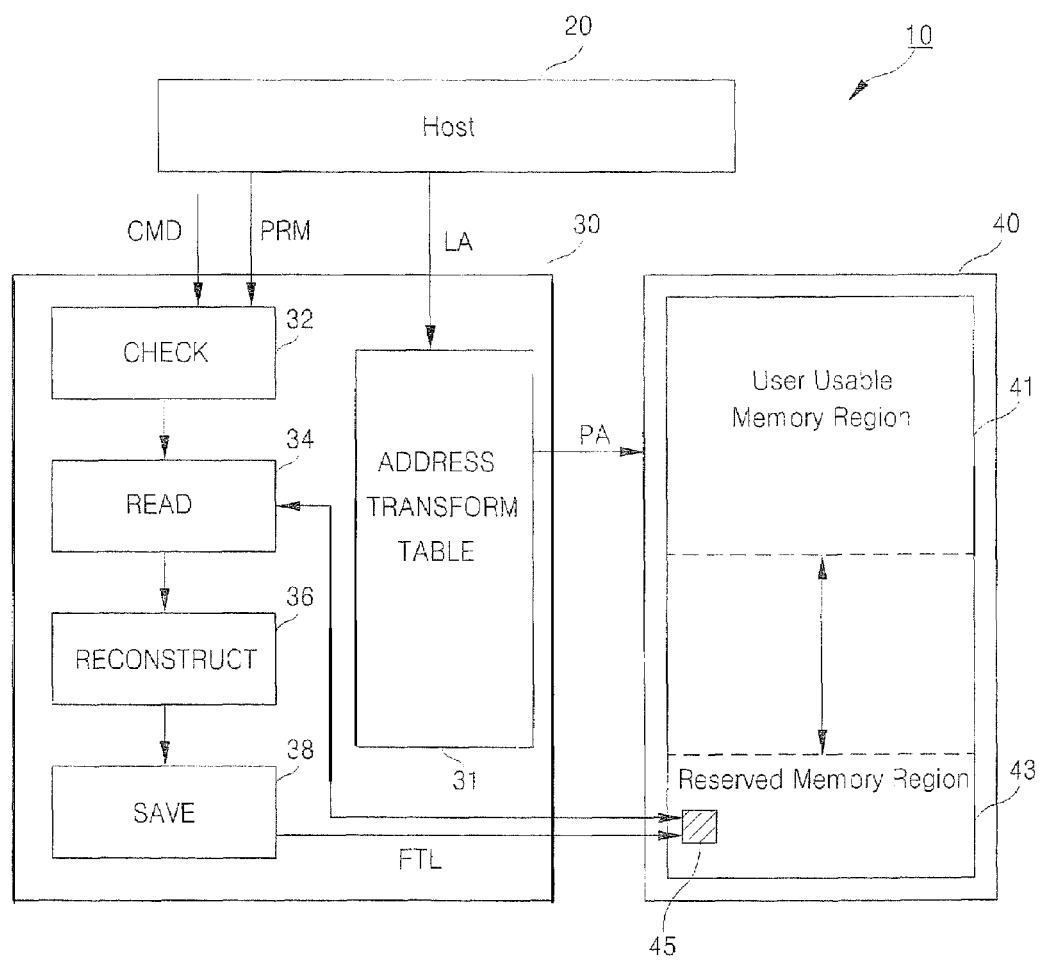
FIG. 1 is a block diagram of an integrated circuit system according to an embodiment of the present invention.

FIG. 1 illustrates an integrated circuit system 10 according to an embodiment of the present invention. This system 10 is illustrated as including a host processor 20, a memory processor 30 and a non-volatile memory device 40, connected as illustrated. The memory processor 30 and the non-volatile memory device 40 may be treated herein as a memory capacity adjusting device. This system 10 may be embodied within a video camera, television, audio system, game console, mobile phone, personal computer, personal digital assistant, voice recorder, memory card, solid state disk drive, or other device that may utilize non-volatile memory.

The host processor 20 within the system 10 may include a file system or file system components and the memory processor 30 may include components that operate as a Flash Translation Layer (FTL) and an address transformation table 31. This address transformation table 31 may be configured as a volatile memory device (e.g., SRAM device) in some embodiments of the invention. As will be understood by those skilled in the art, the FTL may be configured to perform background erase operations on the memory device 40, which may be implemented as a flash EEPROM device. Moreover, the FTL may be configured to translate logical addresses (LA) generated by the host processor 20 into physical addresses (PA) associated with the non-volatile memory device 40, during memory write operations. As illustrated by Blocks 32, 34, 36 and 38, the memory processor 30 may be further configured to perform checking, read, reconstruction and saving operations, as described more fully hereinbelow.

The memory device 40 is illustrated as including at least two memory partitions. These partitions include an active memory region 41, also referred to as a user usable memory region, and a reserved memory region 43. The memory capacity of the active memory region 41 will be referred to herein as the active memory capacity, which reflects the user usable memory capacity, and the memory capacity of the reserved memory region 43 will be referred to herein as the reserved memory capacity.

As will now be described, the active memory capacity and the reserved memory capacity may be adjusted by changing the memory mapping operations performed by the memory processor 30. For example, during manufacture, the memory device 40 may be configured to have a total memory capacity of 16-gigabytes (GB). From this total memory capacity, an initial partitioning of 15 GB may be allocated to the active memory region 41 and an initial partitioning of 1 GB may be allocated to the reserved memory region 43. This 15:1 partitioning ratio between the active memory region 41 and the reserved memory region 43 may be identified by information stored within a memory allocation region 45. This memory allocation 45 may be located within the reserved memory region 43, as illustrated, or may be located within a memory device (not shown) within the memory processor 30.

The initial partitioning specified at the time of manufacture may be adjusted for a given user application. In particular, user applications that involve a relatively high frequency of write (and pre-write erase) operations may benefit from a different partitioning ratio that reduces the size of the active memory region 41 relative to the reserved memory region 43. For example, if an operating system (OS) is installed in the memory device 40, then the partitioning ratio may be changed from 15:1, as set at the time of manufacture, to a lower ratio of 14:2 or lower. This lower ratio results in a greater allocation of memory to the reserved memory region 43 for those cases where there is a higher likelihood that memory defects may develop over time in the active memory region 41 when a relatively high frequency of write operations (and corresponding pre-write erase operations) occur. To achieve this change in the partitioning ratio, a capacity adjusting instruction may be issued by the host processor 20 to the memory processor 30. A sequence of operations for performing the capacity adjusting instruction may be performed by the memory processor 30 and, in particular, may be performed using logic associated with the FTL.

In advance of generating a capacity adjusting instruction, the host processor 20 may issue a capacity checking instruction (or command) to the memory processor 30. In response to this instruction, the memory processor 30 may read information that indicates the partitioning ratio from the memory allocation region 45. This information read from the memory allocation region 45 may specify the capacity of the reserved memory region 43, a ratio of the capacity of the memory device 40 relative to the reserved memory region 43, or a ratio of the active memory region 41 relative to the reserved memory region 43, for example. Based on this information read from the memory allocation region 45, the memory processor 30 may determine a quantity of the reserved memory region 43 and/or a quantity of the active memory region 41. These quantities may then be communicated to the host processor 20.

In response to the capacity checking instruction, the host processor 20 may issue a capacity adjusting instruction (or command CMD) along with a parameter, which can identify a modified partitioning between the reserved memory region 43 and the active memory region 41. In particular, this parameter may specify a size of the active memory region 41, a size of the reserved memory region 43 or a ratio of the active memory region 41 to the reserved memory region 43, for example. This parameter, which may be specified by a user, may be determined from information received at an interface of the host processor 20. In some embodiments of the invention, the parameter may be specified as a reserved memory parameter (PRM), which specifies a size of the reserved memory region 43. Thus, if the user requests an increase in the reserved memory capacity to 2 GB, the host processor 20 may output a parameter PRM that specifies the 2 GB value, to the memory processor 30.

Figure 2:
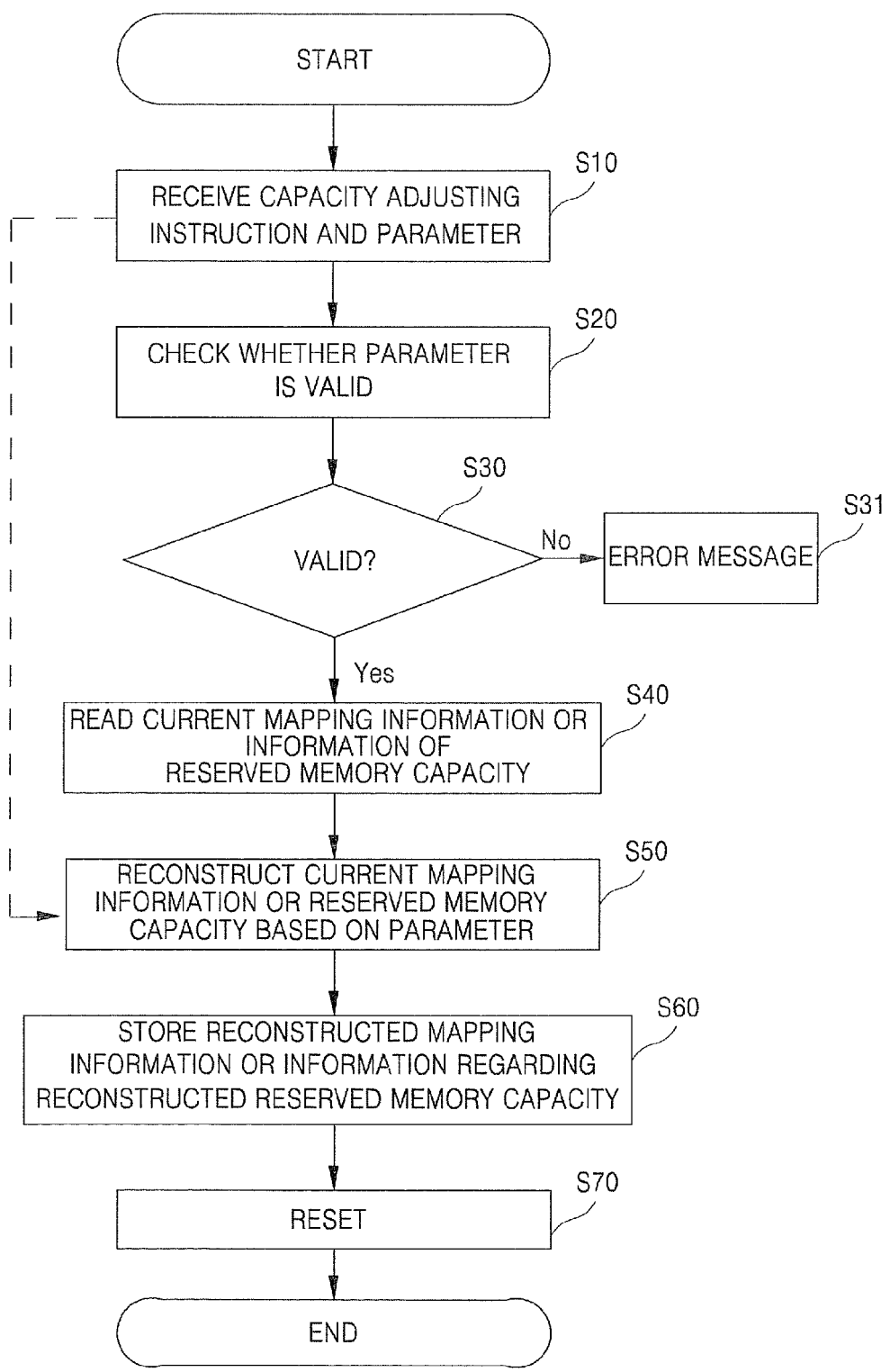
FIG. 2 is a flow diagram that illustrates operations performed by the system of FIG. 1 in response to a capacity adjusting instruction.

As illustrated by the flow diagram of FIG. 2, this receipt of the capacity adjusting instruction and parameter (PRM) by the memory processor 30, Block S10, may result in the performance of a check operation (optional), Blocks S20-S30, to determine whether the parameter PRM is valid. This check operation may be performed by a check logic circuit 32 within the memory processor 30. In the event the parameter PRM is not valid, which means it may have an incorrect format or may be outside a predetermined range, the memory processor 30 may output an error message, Block S31. However, if the parameter PRM is valid, then the memory processor 30 may perform an operation (optional) to read the memory allocation region 45, Block S40. This read operation may be performed by a read logic circuit 34 within the memory processor 30.

A reconstruct logic circuit 36 within the memory processor 30 may then be used to reconstruct the mapping information (e.g., memory map) to accord with the new parameter PRM, Block S50. Based on this reconstruction, a new size of the active memory region 41 (e.g., 14 GB) and the reserved memory region 43 (e.g, 2 GB) may be established and a modified address transformation table 31 may be constructed to correspond to this new allocation ratio. A save logic circuit 38 may then be activated to store a new partitioning (e.g., partitioning ratio) value within the memory allocation region 45, Block S60. A reset operation, Block S70, may then be performed to enable the memory device 40 to be repopulated with new entries that are placed in locations identified by the modified address transformation table 31. These operations identified by FIG. 2 may be performed using exclusively hardware or combinations of hardware and software within the memory processor 30 and/or host processor 20. In some embodiments of the invention, the software may be embodied as a computer-readable program of instructions embodied on a computer-readable medium.

These operations for increasing the capacity of the reserved memory region 43 may also incur in response to detecting an exhaustion of space within the reserved memory region 43 during operation of the memory device 40. For example, in the event the memory processor 30 detects an exhaustion of free space within the reserved memory region 43, which may result from an accumulation of defects within the active memory region 41 during normal use, the memory processor 30 may initiate an increase in the capacity of the reserved memory region 43. Such an increase in the capacity of the reserved memory region 43 may occur multiple times in order to extend the lifetime of the memory device 40.

Alternatively, if the user requests a decrease in the reserved memory capacity to 0.1 GB, the host processor 20 may output a parameter PRM that specifies the 0.1 GB value, to the memory processor 30. This smaller 0.1 GB value may be appropriate for those applications wherein the memory device 40 is not undergoing a high frequency of erase/write operations during normal operation. Such an application may occur when the memory device 40 is being used for data backup purposes, when write operations are seldom. Under these conditions, the active memory region 41 may be allocated to have a capacity of 15.9 GB. The operations described above with respect to FIG. 2 may then be repeated for the case where the PRM designates a 0.1 GM value for the reserved memory region 43.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An integrated circuit system, comprising:
a memory processor configured to receive logical memory addresses from a host and output physical addresses in response thereto;
and a non-volatile memory in communication with the memory processor to receive the physical addresses from memory processor to access memory locations of the non-volatile memory corresponding to respective ones of the physical addresses,
wherein the integrated circuit system is responsive to a user selecting a value to adjust a user useable capacity, as viewed by the host, of the non-volatile memory, based upon a likelihood of a frequency of write operations to the integrated circuit system; and configured to store, in the non-volatile memory system, an updated partitioning parameter in response to the selected value,
wherein the memory processor is configured to receive a command by a host to adjust the user usable capacity, as viewed by the host, of the non-volatile memory, and wherein the integrated circuit system is responsive to the stored updated partitioning parameter to adjust a partitioning ratio of the user usable capacity and a capacity of a reserved memory, modifying the reserved memory capacity of the non volatile memory in response to the partitioning parameter, the reserved memory including replacement memory for defective blocks.

2. The integrated circuit system of claim 1, wherein said memory processor is further configured to read a memory allocation region within the integrated circuit system to determine the user usable capacity of the non-volatile memory.

3. The integrated circuit system of claim 2, wherein said memory processor comprises an address transformation table configured to generate the physical memory addresses that map to said non-volatile memory device in response to the logical memory addresses received by said memory processor.

4. The integrated circuit system of claim 1, wherein said memory processor is further configured to read a memory allocation region within said nonvolatile memory device to determine the user usable capacity.

5. The integrated circuit system of claim 4, wherein said non-volatile memory device is a flash EEPROM device.

6. The integrated circuit system of claim 5, wherein said memory processor comprises an address transformation table configured to generate the physical memory addresses that map to said non-volatile memory device in response to the logical memory addresses received by said memory processor.

7. The integrated circuit system of claim 1, wherein the memory processor is configured to receive a command by a host to adjust a user usable capacity to a relatively larger value.

8. The integrated circuit system of claim 7, wherein the adjustment of the user usable capacity to a relatively larger value results in a reduction of a reserve space of the non-volatile memory.

9. The integrated circuit system of claim 8, wherein the reserve space is used for replacing defective memory associated with the user usable capacity.

10. The integrated circuit system of claim 1, wherein the memory processor is configured to receive a command to adjust a user usable capacity to a relatively lower capacity.

11. The integrated circuit system of claim 10, wherein the adjustment of the user usable capacity to a relatively smaller value results in an increase of a reserve space of the non-volatile memory.

12. The integrated circuit system of claim 11, wherein the reserve space is used for replacing defective memory associated with the user usable capacity.

13. The integrated circuit system of claim 1, wherein the memory processor is configured to adjust a user usable capacity to a relatively lower capacity and to adjust a user usable capacity to a relatively higher capacity in response to a respective external host commands.

14. The integrated circuit system of claim 1, further comprising:
a flash translation layer (FTL) component configured to translate the logical memory addresses to the physical addresses.

15. The integrated circuit system of claim 14, wherein the FTL component comprises an address transformation table implemented in an SRAM.

16. The integrated circuit system of claim 14, wherein the FTL component is configured to perform background erase operations on the non-volatile memory.

17. The integrated circuit system of claim 1, wherein the memory processor is configured to adjust the active memory capacity by changing a memory mapping operation.

18. The integrated circuit system of claim 1, further comprising a storage element to store a parameter, the memory processor being responsive to the parameter to adjust a partitioning ratio of the user usable capacity and a reserve memory portion of the non-volatile memory.

19. The integrated circuit system of claim 18, wherein the memory processor comprises the storage element.

20. The integrated circuit system of claim 18, wherein the storage element is a portion of the reserve memory portion of the non-volatile memory.

21. The integrated circuit system of claim 18, wherein the storage element is external to the non-volatile memory.

22. The integrated circuit system of claim 1, wherein the non-volatile memory comprises a reserved region including a memory allocation region to store a parameter, the memory processor responsive to the parameter stored in the memory allocation region to adjust the user usable capacity.

23. An integrated circuit system, comprising: a non-volatile memory device; and a memory processing circuit electrically coupled to said non-volatile memory device, said memory processing circuit configured, in response to a capacity adjust command, to reallocate addressable space within said nonvolatile memory device by increasing a number of physical addresses within said non-volatile memory device, the number of physical addresses corresponding to a size of a user usable memory capacity as viewed by a host wherein the integrated circuit system is responsive to a user selecting a value to adjust a user useable capacity, as viewed by the host, of the non-volatile memory, based upon a likelihood of a frequency of write operations to the integrated circuit system; and configured to store, in the non-volatile memory system, an updated partitioning parameter in response to the selected value, wherein the integrated circuit system is responsive to the stored updated partitioning parameter to adjust a partitioning ratio of the user usable capacity and a capacity of a reserved memory, modifying the reserved memory capacity of the non volatile memory in response to the partitioning parameter, the reserved memory including replacement memory for defective blocks.

24. The integrated circuit system of claim 23, wherein said memory processing circuit comprises an address transformation table configured to generate physical addresses that map to said non-volatile memory device in response to logical addresses received by said memory processing circuit.

25. The integrated circuit system of claim 24, wherein said memory processing circuit is further configured to read a memory allocation region within said nonvolatile memory device to determine a capacity of an active memory region and/or a reserved memory region within said non-volatile memory device, in response to the capacity adjust command received by said memory processing circuit.

26. The integrated circuit system of claim 23, wherein said memory processing circuit is further configured to read a memory allocation region within said nonvolatile memory device to determine a capacity of an active memory region and/or a reserved memory region within said non-volatile memory device, in response to the capacity adjust command received by said memory processing circuit.

27. The integrated circuit system of claim 26, wherein said memory processing circuit is further configured to write data into the memory allocation region within said non-volatile memory device, in response to the capacity adjust command received by said memory processing circuit.

28. A method of adjusting a user usable capacity of a non-volatile memory system based on a frequency of write operations to the non-volatile memory system, in the non-volatile memory system comprising: at least an active memory capacity, and a reserved memory capacity and a storage part to store a parameter, the method comprising: a user selecting a value to adjust the active memory capacity based upon a likelihood of a frequency of write operations to the non-volatile memory system; and storing, in the non-volatile memory system, an updated partitioning parameter in response to the selected value, wherein a command along with the partitioning parameter is sent by the host to the non volatile memory system to adjust the user usable capacity wherein the non-volatile memory system is responsive to the stored updated partitioning parameter to adjust the partitioning ratio of the active memory capacity and the reserved memory capacity, modifying the capacity of the reserved memory of the non volatile memory in response to the partitioning parameter, the reserved memory including replacement memory for defective blocks, and wherein the active memory capacity represents a user usable capacity as viewed by a host system.

29. The method of claim 28, wherein the selected value is a selected partitioning ratio.

* * * * *